(12) United States Patent
Curry (10) Patent No.: US 9,091,789 B2
(45) Date of Patent: Jul. 28, 2015

(54) SEISMIC SIGNAL PROCESSING METHOD WITH GAUSSIAN SLOWNESS-PERIOD PACKETS

(75) Inventor: William J. Curry, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 451 days.

(21) Appl. No.: 13/639,802

(22) PCT Filed: Mar. 10, 2011

(86) PCT No.: PCT/US2011/027932
§ 371 (c)(1),
(2), (4) Date: Oct. 5, 2012

(87) PCT Pub. No.: WO2011/139411
PCT Pub. Date: Nov. 10, 2011

(65) Prior Publication Data
US 2013/0044568 A1    Feb. 21, 2013

Related U.S. Application Data (60) Provisional application No. 61/332,468, filed on May 7, 2010.

(51) Int. Cl.
*H03F 1/26* (2006.01)
*G01V 1/36* (2006.01)
*H04B 15/00* (2006.01)

(52) U.S. Cl.
CPC ............ *G01V 1/364* (2013.01); *G01V 2210/20* (2013.01)

(58) Field of Classification Search
CPC ............................ G01V 1/28; G01V 2210/20
See application file for complete search history.

(56) References Cited

U.S. PATENT DOCUMENTS

| | | | |
|---|---|---|---|
| 6,404,934 B1 | 6/2002 | Lee et al. | |
| 6,457,032 B1 | 9/2002 | Silver | |
| 6,691,039 B1 | 2/2004 | Wood | |
| 6,721,662 B2 | 4/2004 | Wood | |

(Continued)

FOREIGN PATENT DOCUMENTS

EP    1 668 593    9/2004

OTHER PUBLICATIONS

Canales, L.L. (1984), "Seismic Processing IV," *SEG Expanded Abstracts* 3, pp. 525-527.

(Continued)

*Primary Examiner* — Phuong Huynh
(74) *Attorney, Agent, or Firm* — ExxonMobil Upstream Research Company Law Dept.

(57) ABSTRACT

Method for addressing non-stationary seismic data for data processing techniques (106) that assume that the data are stationary. In the present invention, windowing operations are applied, not in time and space as in traditional methods, but in frequency and wavenumber. This windowing in frequency and wavenumber is done implicitly by a cascade of separable one dimensional time and spatial filtering operations (104). These filters are Gaussian functions modulated by a complex exponential. By using a variety of these filters, the input data can be decomposed into a series of slopes and frequencies that can be reassembled to the original by applying the adjoint operation followed by a weighted sum (108). This decomposed domain of time, space, frequency and slope can be used as a domain where a priori information about the output can be applied in a straightforward manner.

13 Claims, 9 Drawing Sheets

(56) References Cited

U.S. PATENT DOCUMENTS

| | | | |
|---|---|---|---|
| 6,735,528 | B2 | 5/2004 | Wood et al. |
| 6,910,060 | B2 | 6/2005 | Langan et al. |
| 6,987,706 | B2 | 1/2006 | Wood |
| 7,366,054 | B1 | 4/2008 | Wood |
| 7,379,386 | B2 | 5/2008 | Muyzert et al. |
| 7,382,682 | B2 | 6/2008 | Zerouk |
| 7,382,684 | B2 | 6/2008 | Love et al. |
| 7,408,836 | B2 | 8/2008 | Muyzert et al. |
| 7,466,625 | B2 | 12/2008 | Robertsson et al. |
| 7,617,053 | B2 | 11/2009 | Pinnegar et al. |
| 2005/0135188 | A1 | 6/2005 | Wood |
| 2007/0038691 | A1 | 2/2007 | Candes et al. |
| 2007/0116373 | A1* | 5/2007 | Hwang et al. ............... 382/261 |
| 2007/0265786 | A1 | 11/2007 | Ozdemir et al. |
| 2008/0015783 | A1 | 1/2008 | Robertsson et al. |
| 2008/0033655 | A1 | 2/2008 | Ozbek et al. |
| 2008/0205196 | A1 | 8/2008 | Love et al. |
| 2009/0005999 | A1 | 1/2009 | Wood et al. |
| 2009/0135670 | A1* | 5/2009 | Deffenbaugh et al. ......... 367/43 |
| 2009/0229819 | A1* | 9/2009 | Repin et al. ............. 166/250.01 |
| 2010/0286920 | A1 | 11/2010 | Day et al. |

OTHER PUBLICATIONS

Claerbout, J.F. (1992), "Earth Sounding Analysis: Processing versus Inversion," *Blackwell*, p. 91.

Clapp, R.G. et al. (2004), "Incorporating geologic information into reflection tomography," *Geophysics* 69(2), pp. 533-546.

Crawley, S. et al. (1999), "Interpolation with smoothly nonstationary prediction-error filters," *SEG Expanded Abstracts* 18, pp. 1154-1157.

Daugman, J.G. (1988), "Complete Discrete 2-D Gabor Transforms by Neural Networks for Image Analysis and Compression," *IEE Transactions on Acoustics, Speech, and Signal Processing* 36(7), pp. 1169-1179.

Gutton, A. (2005), "Multiple attenuation in complex geology with a pattern-based approach," *Geophysics* 70(4), pp. V97-V107.

Fomel, (2002), "Application of plane-wave destruction filters," *Geophysics* 67, pp. 1946-1960.

Gülünay, N. (2003), "Seismic trace interpolation in the Fourier transform domain," *Geophysics* 68(1), pp. 355-369.

Hale, D. (2005), "Fast local cross-correlations of images," *SEG Expanded Abstracts* 26, pp. 3160-3164.

Hale, D. (2009), "An efficient method for computing local cross-correlations of multi-dimensional signals," *Center for Wave Phenomena, Colorado School of Mines*, pp. 1-7.

Herrmann, F.J. et al. (2008), "Adaptive curvelet-domain primary-multiple separation," *Geophysics* 73(3), pp. A17-A21.

Pinnegar, C.R. et al. (2003), "The S-transform with windows of arbitrary and varying shape," *Geophysics* 68(1), pp. 381-385.

Spitz, S. (1991), "Seismic trace interpolation in the F-X domain," *Geophysics* 56(6), pp. 785-794.

Stockwell, R.G. et al. (1996), "Localization of the Complex Spectrum: The S Transform," *IEE Transactions on Signal Processing* 44(4), pp. 998-1001.

* cited by examiner

SEISMIC SIGNAL PROCESSING METHOD WITH GAUSSIAN SLOWNESS-PERIOD PACKETS

CROSS-REFERENCE TO RELATED APPLICATION

This application is the National Stage entry under 35 U.S.C. 371 of PCT/US2011/027932 that published as WO 2011/139411 and was filed on 10 Mar. 2011, which claims the benefit of U.S. Provisional Application No. 61/332,468, filed 7 May 2010, each of which is incorporated herein by reference, in its entirety, for all purposes.

FIELD OF THE INVENTION

This invention relates generally to the field of geophysical prospecting and, more particularly to seismic data processing. Specifically, the invention relates to seismic signal processing techniques that incorporate non-stationarity with respect to the seismic data.

BACKGROUND OF THE INVENTION

Many seismic signal processing techniques are applied to seismic data to enhance a migrated image, including regularization to create unrecorded traces needed by many processing algorithms, coherent noise attenuation to remove energy that does not contribute to the image, and random noise attenuation to enhance coherent events both before and after imaging. Often the underlying assumptions behind many of these signal processing techniques include an assumption of stationarity: that the events are planar in nature and that their dip or frequency content does not change with position. In reality, seismic data are non-stationary; they contain events with curvature and the frequency content changes as the recording time increases. This problem is well known, and several methods to address non-stationary data do exist. These include: breaking up the problem into overlapping spatial-temporal windows that are assumed to be locally stationary followed by processing and reassembly; the use of non-stationary filters that vary with space and time; and methods like the curvelet transform that expand the data into a compressible overrepresentation. The present invention is an alternative to these methods, an alternative that allows for more flexibility in handling non-stationarity in the data.

Patch-Based Methods

The most common way to apply signal processing algorithms that assume a stationary input to data that are not stationary is (see FIG. 1) to break up the problem into a series of overlapping patches that are then assumed to be locally stationary (step 10), followed by the desired processing of each window independently (step 12), followed by reassembly of the processed patches (step 14). This approach is widely used in slope estimation (Claerbout, *Earth Soundings Analysis: Processing versus Inversion*, Blackwell, page 91 (1992)), interpolation (Spitz, *Geophysics* 56, 785-794 (1991)) and signal noise separation methods such as f-x deconvolution (Canales, *SEG Expanded Abstracts* 3, 525-527 (1984)) that all assume that the data are composed of one or more superimposed planar events. The benefit of the patch-based approach is efficiency in two dimensions. One drawback is relatively poor scaling to higher dimensions as the amount of overlap increases with dimensionality. Another drawback is the possibility that individual patches can produce an unexpected result that either produces visible patch boundaries in the merged result or, if the patch overlap is considerable, this problematic patch is averaged with the surrounding patches to produce errors that are difficult to track.

Non-Stationary Filtering

An alternative to the patch-based approach is to solve for filters that vary as a function of position. One example of this is the use of non-stationary prediction-error filters for either interpolation (Crawley et al., *SEG Expanded Abstracts*, 1999, Vol. 18, Pages 1154-1157) or signal/noise separation (Guitton, *Geophysics*, 2005, Vol. 70, Pages V97-V107). This spatially variable filter is estimated on the entire dataset simultaneously by solving a large inverse problem for all of the filter coefficients. Since these filters vary with position, the number of unknown filter coefficients can be larger than the number of known data points, creating an underdetermined problem that is solved by adding regularization to create a smoothly non-stationary prediction-error filter. This has the benefit that the filter varies smoothly as a function of position and does not have the problem with visible boundaries that the patch-based approach does. However, creating a nonstationary filter is nonunique, so many of the benefits of a prediction-error filter that depend on solving an overdetermined unique problem are gone, such as a guarantee of minimum phase, among other benefits. The size of the filter also scales poorly with the number of dimensions involved, making higher-dimensional filtering computationally expensive.

Another nonstationary filter often used is a local plane-wave destructor filter (Fomel, *Geophysics* 67, 1946-1960, (2002)) or a steering filter (Clapp, *Geophysics* 69, 533-546 (2004)). These filters are stable and can be used to estimate local slope. This method is efficient, but when dealing with data with multiple conflicting slopes has difficulty and can alternate rapidly between the two possible slopes. Spatially aliased data also present problems as there are multiple possible solutions to the slope estimation problem.

A more recent approach to dealing with nonstationarity is from Hale (*SEG Expanded Abstracts* 26, 3160-3164 (2006)). Hale efficiently computes Gaussian windows in time and space using both the separability of multidimensional Gaussians as well as recursive filtering that he uses to solve for local cross-correlations and auto-correlations of data, which he can then use to generate local prediction-error filters. This method works well, but assumes that the data are well-sampled. Hale uses this same efficient Gaussian smoothing to smooth the output of slope estimation from a structure tensor. Current uses of Gaussian filtering in time and space are limited to methods that depend on efficient cross and auto correlations, and for smoothing the output of other processes. Moving to a domain where prior information is more easily enforced, such as the frequency-wavenumber domain, is not straightforward with this approach.

The S transform (Stockwell, Mansinha and Lowe, *IEEE Signal Processing*, 1996, Vol. 44, Pages 998-1001; Pinnegar and Mansinha, *Geophysics*, 2003, Vol. 68, Pages 381-385; and U.S. Pat. No. 7,617,053 to Pinnegar et al.) uses modulated Gaussian functions for time frequency analysis, but only along in a single dimension as an alternative to a spectrogram.

Gabor filtering (Daughman, *IEE Trans. On Acoustics, Speech, and Signal Processing*, 1988, Vol. 36, Pages 1169-1179), used in image analysis and edge detection, uses modulated Gaussian functions in multiple spatial dimensions. These filters are typically parameterized by a rotation and dilation, making them non-separable. Since applications are limited to 2 or 3 spatial dimensions, separability and parallelization are less of an issue than with higher-dimensional seismic data. In addition, using this type of filter on data with time and spatial axes might be confusing, as the rotation would span different frequency ranges depending on the rotation.

Curvelets

Another approach to the problem of nonstationarity is to use local basis functions. The curvelet transform (U.S. Patent Application Publication U.S. 20070038691 by Candes et al) is a transform that is a partition of the frequency-wavenumber domain where the data are broken up into various sized windows in scale and angle according to a parabolic-dyadic scaling law, and then each window is returned to the time-space domain on a different grid by an inverse Fourier transform to produce an output in angle, scale, time, and space.

Curvelets have largely been used for compressive sensing, where the compressive qualities of curvelets on seismic data are used to eliminate noise or interpolate missing data. This method works provided that certain underlying assumptions are fulfilled. For the interpolation case, this is that the data are randomly sampled, producing a low-amplitude blur in both the frequency-wavenumber and curvelet domains. For a signal/noise case, an adaptive subtraction of externally modeled noise can take place in the curvelet domain. Curvelets address the problem of nonstationarity, and work when simple operations such as thresholding or subtraction take place in the curvelet domain.

Applying operators across this curvelet domain is difficult, as the grid spacing and orientation differ for each scale and angle. Additionally, the parameterization of the curvelet space is difficult, as the parameters of scale and number of angles are not intuitive. Finally, curvelets become computationally expensive in higher dimensions, where the gridding and overrepresentation of the data increase greatly.

No single method deals with nonstationarity in a way that is stable, easily parallelizable, easily scalable to higher dimensions, and easily incorporates prior knowledge. The present invention satisfies these requirements.

SUMMARY OF THE INVENTION

In one embodiment, the invention is a method for producing a representation of a subsurface region from multi-dimensional seismic data, comprising
(a) using a cascade of filtering operations to decompose the seismic data into components in a frequency-wavenumber domain wherein the data are represented in terms of tiled windows;
(b) applying one or more processing operations to the decomposed data, said processing operations being designed to enhance a representation of the subsurface region from the seismic data;
(c) applying the filtering operations' adjoint operations to the decomposed data after the processing operations, then summing data components weighted by normalization factors computed to produce a flat impulse response; and
(d) using the weighted and summed data from (c) to generate a representation of the subsurface region.

The inventive method is advantageous where the processing operations require an assumption of local stationarity and the data are not stationary, that is that the dip or frequency spectra of the seismic data change with position and time. The cascade of filtering operations may be a series of 1D Gaussian filters modulated by complex exponentials, creating a series of Gaussian windows in the frequency-wavenumber domain.

As with any seismic data processing method, the invention in practical applications is highly automated, i.e. is performed with the aid of a computer programmed in accordance with the disclosures herein.

BRIEF DESCRIPTION OF THE DRAWINGS

The present invention and its advantages will be better understood by referring to the following detailed description and the attached drawings in which:

FIGS. 5-12 illustrate example applications of the invention, where:

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention is an alternative to existing methods to address non-stationary data, an alternative that allows for more flexibility in handling non-stationarity in the data, by allowing the incorporation of prior knowledge along many dimensions in the data: spatial, temporal, and their Fourier equivalents. This disclosure explains how to construct a representation that scales in an easily parallelizable way to higher dimensions, and can be used for interpolation, signal/noise separation, and decomposition of seismic data. This invention is applicable to multidimensional seismic signal processing, both before and after imaging. The invention allows for a straightforward method to process data in frequency, time, and multiple spatial axes and slopes, or any subset of these, all simultaneously.

Figure 1:
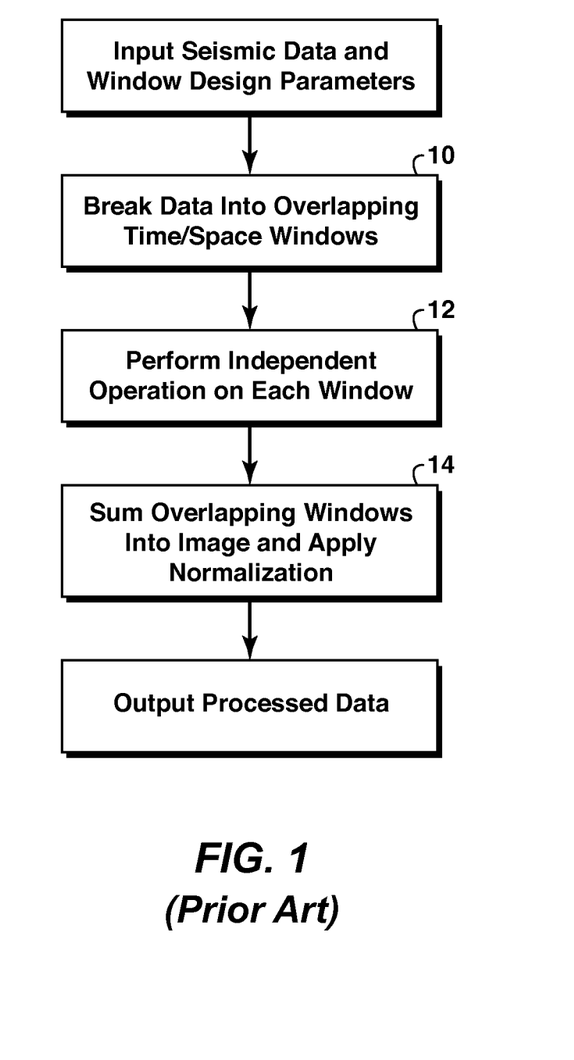
FIG. 1 is a flow-chart showing a conventional patch-based approach to dealing with nonstationary data.
Figure 2:
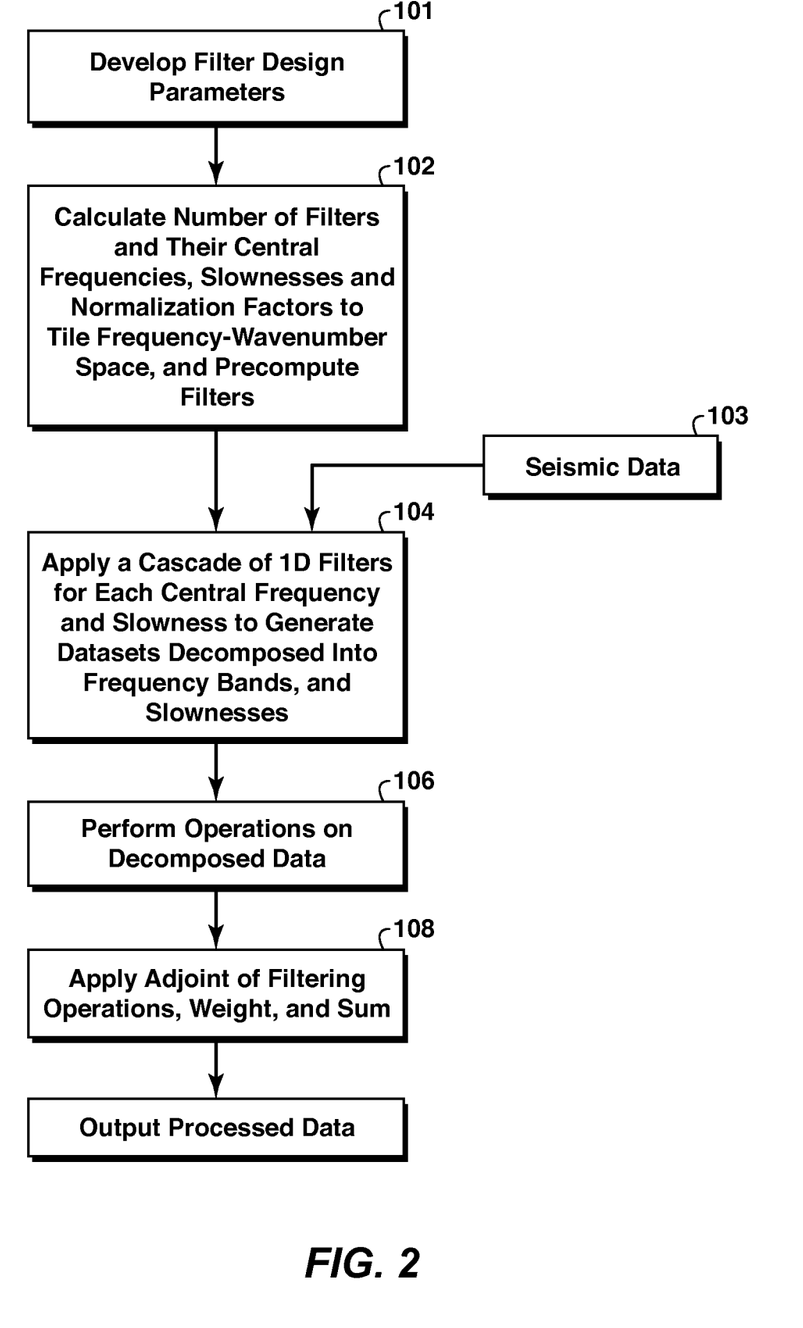
FIG. 2 is a flowchart showing basic steps in one embodiment of the present inventive method, applied to a two-dimensional case.

FIG. 1 is a flow chart describing a traditional patching approach described in the "Background" section, while FIG. 2 is a flow chart showing basic steps in one embodiment of the present inventive method. In the present invention, one begins by first applying windowing operations, not in time and space as in FIG. 1 but in frequency and wavenumber. This windowing in frequency and wavenumber is done implicitly by a cascade of separable one dimensional time and spatial filtering operations. These filters are Gaussian functions modulated by a complex exponential. By using a variety of these filters, the input data can be decomposed into a series of slopes and frequencies that can be reassembled to the original by applying the adjoint operation followed by a weighted sum. This decomposed domain of time, space, frequency and slowness can be used as a domain where a priori information about the output can be applied in a straightforward manner.

The present invention uses a cascade of one-dimensional Gaussian filters coupled with complex exponentials to create a tiling of overlapping Gaussian data-sampling windows in the frequency and wavenumber domains. The method of tiling the frequency and wavenumber domains may be directed toward pre-stack seismic data, where the tiling is in frequency and slowness. For an example in depth, the depth axis could be treated in a similar fashion to an additional spatial axis, meaning a regular tiling when the time axis is not present.

Separable Multidimensional Modulated Gaussian Filtering

The derivation of the one-dimensional Gaussian filters starts with a pair of desired multidimensional Gaussian windows in frequency (f) and wavenumber (k) with a central frequency and wavenumber $f_0$ and $k_0$, and half widths at half maxima $h_f$ and $h_k$ for the frequency and wavenumber axes, respectively, where $$G_{f_0 k_0}(f, k) = e^{-\left(\frac{(f-f_0)^2 \ln 2}{h_f^2} + \frac{(k-k_0)^2 \ln 2}{h_k^2}\right)} + e^{-\left(\frac{(f+f_0)^2 \ln 2}{h_f^2} + \frac{(k+k_0)^2 \ln 2}{h_k^2}\right)}. \quad (1)$$

This two dimensional filter can be separated into two products of two Gaussian functions that have been convolved with shifted delta functions so that $$G_{f_0 k_0}(f, k) = \left(\delta(f - f_0) * e^{-\left(\frac{f^2 \ln 2}{h_f^2}\right)}\right)\left(\delta(k - k_0) * e^{-\left(\frac{k^2 \ln 2}{h_k^2}\right)}\right) + \left(\delta(f + f_0) * e^{-\left(\frac{f^2 \ln 2}{h_f^2}\right)}\right)\left(\delta(k + k_0) * e^{-\left(\frac{k^2 \ln 2}{h_k^2}\right)}\right). \quad (2)$$

This sequential application, or cascade, of filters can be performed in the time and space domain as the convolution of two 1D filters, each composed of a Gaussian multiplied by a complex exponential, where $$g_{f_0 k_0}(t, x) = \frac{\pi h_f h_k}{\ln 2}\left[\left(e^{i 2\pi f_0 t} e^{-\frac{\pi^2 t^2 h_f^2}{\ln 2}}\right) * \left(e^{i 2\pi k_0 x} e^{-\frac{\pi^2 x^2 h_k^2}{\ln 2}}\right) + \left(e^{-i 2\pi f_0 t} e^{-\frac{\pi^2 t^2 h_f^2}{\ln 2}}\right) * \left(e^{-i 2\pi k_0 x} e^{-\frac{\pi^2 x^2 h_k^2}{\ln 2}}\right)\right]. \quad (3)$$

If $f_0$ is larger than $h_f$, this addition of two cascaded series of filters can be approximated by taking two times the real portion of the output of one of these filters, so that $$g_{f_0 k_0}(t, x) * d(t, x) = \quad (4)$$
$$\frac{2\pi h_f h_k}{\ln 2} \operatorname{Re}\left(\left(e^{i 2\pi f_0 t} e^{-\frac{\pi^2 t^2 h_f^2}{\ln 2}}\right) * \left(e^{i 2\pi k_0 x} e^{-\frac{\pi^2 x^2 h_k^2}{\ln 2}}\right) * d(t, x)\right).$$

In an alternate embodiment, in the case where very low and zero frequencies are desired, the above implementation can be replaced by applying both cascades of filters in equation 3 separately to produce separate complex outputs.

The half widths at half maxima of the filters can be expressed either in time/space or frequency/wavenumber using the relation $h_f = \ln 2/\pi h_t$, depending on the desired input parameterization and tiling, discussed in detail next.

Implicit Tiling of the Frequency/Wavenumber Domain

Another feature of this invention is a method of tiling of the frequency wavenumber domain in a manner best suited for pre-stack seismic data.

Figure 3:
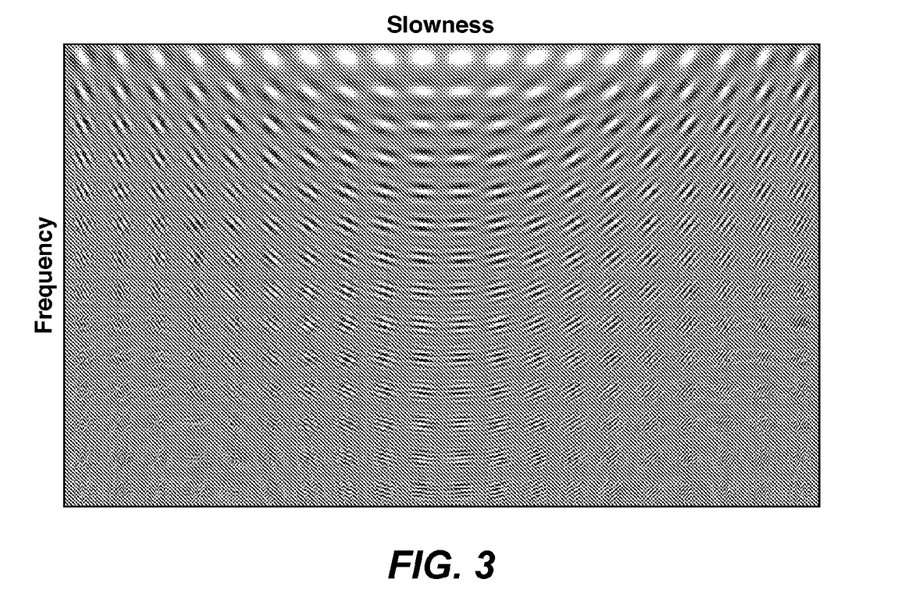
FIG. 3 shows examples of 2D Gaussian slowness-period packets generated by cascaded 1D filtering, where slowness varies from left to right and frequency (f) from top to bottom.
Figure 4:
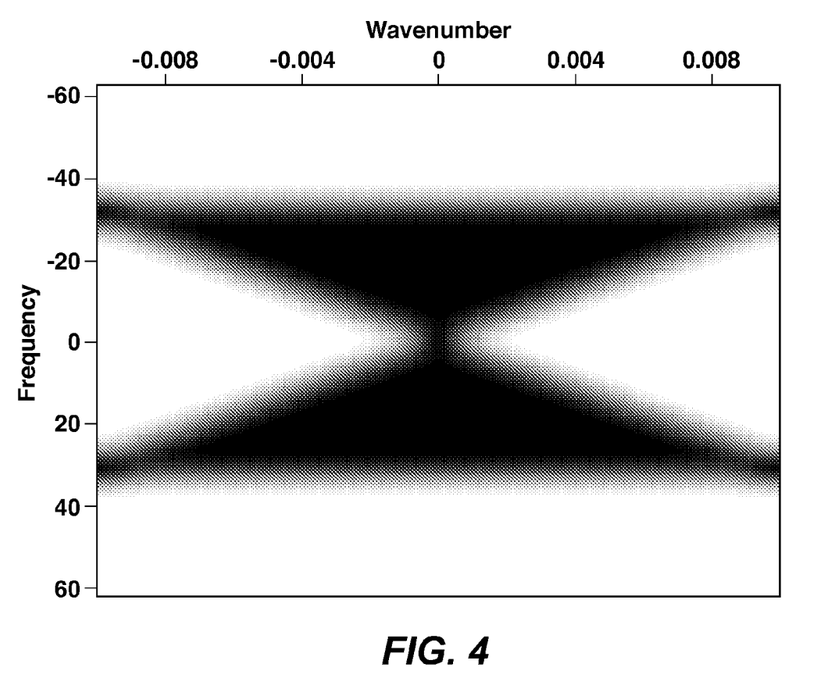
FIG. 4 shows frequency impulse response (black is 1, white is 0) after applying the forward and adjoint transform using the filters shown in FIG. 3.

Frequency sampling should be such that the impulse response of the cascaded forward and adjoint operator is flat. For the forward operator, the Gaussians should be shifted by $h_f$ or less relative to each other such that the windows sum to produce a flat response. When $n_f$ Gaussian windows are applied across the frequency axis with a half-width in time of $h_t$, the corresponding frequency half-width after the forward and adjoint operations is $\sqrt{2} \ln 2/\pi h_t$. Setting the frequency sampling equal to this value gives $$W_f = \sum_{m=-(n_f-1)/2}^{(n_f-1)/2} 2 e^{-\frac{\pi^2 h_t^2}{\ln 2}\left(\frac{f_{max} - f_{min}}{2} - m \frac{\sqrt{2} \ln 2}{\pi h_t}\right)^2} \quad (5)$$

as a normalization factor to rescale the frequency response to unity after the forward and inverse transforms. In equation (5), $f_{max}$ and $f_{min}$ are the specified minimum and maximum central frequencies of the time-domain Gaussian windows. The tiling in wavenumber for prestack seismic data is best suited to a regular tiling in slowness, with spacing in slowness such that the tiling along wavenumber at the maximum frequency produces a flat impulse response. This maximum spacing is given by the half-width of the operator, either in wavenumber or in space, and is $\sqrt{2}h_k$ or $\sqrt{2}\ln 2/\pi h_x$ and the sampling interval in p, $\Delta p$, is this value divided by the maximum frequency. (p is the slowness, which is related to the wavenumber k by $k=f_p$.) At each output frequency, this constant sampling in p will produce a different normalization factor roughly equivalent to the $\omega$ scaling needed by a tau-p transform, and is $$W_p(f) = \sum_{l=-(n_p-1)/2}^{(n_p-1)/2} 2e^{-2\frac{(2\pi h_x l\Delta pf)^2}{\ln 2}}, \quad (6)$$

where $n_p$ slownesses are sampled. This product of the present invention may be called Gaussian slowness-period packets ("GaSPs"), represented by g in the equations above. A collection of these GaSPs" is shown in FIG. 3, where adjacent GaSPs on the horizontal axis vary in slowness and adjacent GaSPs on the vertical axis vary in frequency. The frequency response of the forward and adjoint application and weighting of these GaSPs is shown in FIG. 4, where black indicates a value of 1 and white indicates 0. The frequency response in this case is nearly perfectly flat within the desired region of interest to more than six significant digits, with the response within four significant digits of unity.

Combining the two concepts of the separable Gaussian functions and the frequency-slowness tiling produces a transform that can be used in the following steps, as described in FIG. 2.

At step 101, given desired input parameters, including a desired frequency and slowness range and either time or spatial half-width of operators, desired frequency and slowness discrimination, or the number of desired central frequencies and slownesses, define a tiling so that the impulse response is flat after a forward and inverse transform, which corresponds to a spacing equal to $1/\sqrt{2}$ times the half-width of the operators in frequency and in slowness.

At step 102, precompute the necessary 1D filters required for the tiling, which is (approximately $n_f + n_f n_p$ filters) as well as the $n_f + 1$ normalization factors to produce a flat impulse response after forward and adjoint transforms.

At step 104, for each desired central frequency and slowness defined in step 101, apply a cascade of 1D modulated Gaussian filters to the seismic data 103 to generate a filtered version of the data for each central frequency and central slowness. It may be noted that the terms slope, dip, and slowness may be used more or less interchangeably, with slowness more applicable to an unimaged seismic data case, where the axes are time and space, whereas slope or dip are commonly used when dealing with imaged or migrated data, where the axes are often x, y, and depth.

At step 106, apply an operation or operations to the transformed datasets. These operations could include element-by-element operations such as muting or thresholding, operators that span any of the axes of the datasets: the time axis, spatial axes, slope axes, or the frequency axis, such as applying filters along any of these axes. In general, these are data processing operations that are usually performed in the transform domain where they must assume data stationarity. Alternately, this decomposition could be done for two or more datasets and operations performed on the combination of datasets.

At step 108, apply the adjoint operation by reapplying the same filters to the decomposed data, followed by a sum weighted by the normalization factors computed in step 102.

The flowchart and examples below are for the 2-D case, with time and space transforming to frequency and wavenumber. However, it can be appreciated that the separable Gaussian filters and transform tiling described here really apply to any number of dimensions, which may include as many as seven: three spatial dimensions for each of the source and the receiver, and time, although if source and receiver are located on the Earth's surface, the number reduces to five. In fact, it is a particularly advantageous feature of this inventive method that it has beneficial scaling and efficiencies in higher dimensions that other local transforms lack.

EXAMPLES

Beyond-Aliasing Interpolation

A commonly-used interpolation method for pre-stack reflection seismic data is f-k interpolation (Gulunay, *Geophysics* 68, 355-369 (2003)) where regularly-sampled data can be interpolated correctly despite the Shannon-Nyquist sampling criterion by incorporating prior information; in this case the prior information is a weighting function generated from the low frequencies present in the data. This is typically accomplished in the Fourier domain, and as such assumes stationarity, so the method is typically applied in overlapping spatial-temporal patches.

Gaussian slowness period packets can be used instead of these windows, and the problem can be reformulated so that the lower-frequency GaSPs are used to constrain the higher-frequency GaSPs, and remove the aliased energy caused by the coarse sampling.

Figure 5:
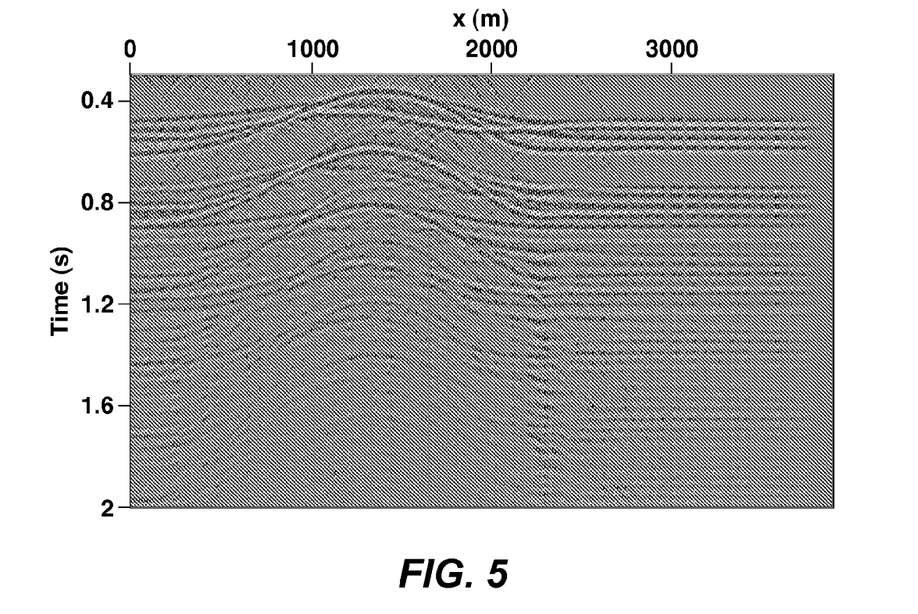
FIG. 5 shows an input zero-offset section of a synthetic 2D marine dataset, with variable slopes and multiple crossing spatially-aliased events.
Figure 6:
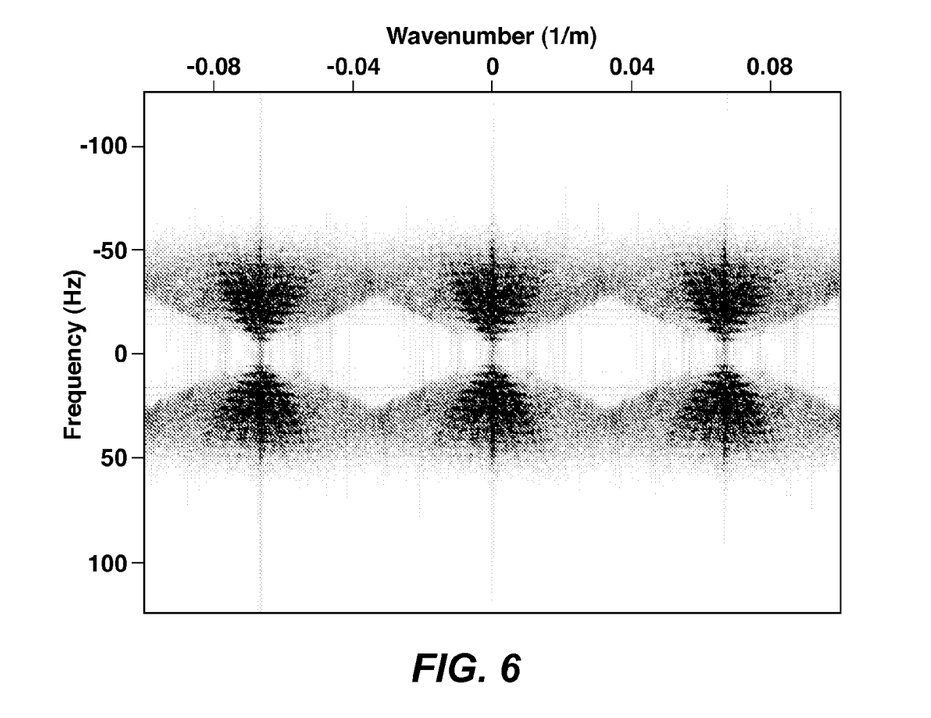
FIG. 6 shows absolute value of the 2D Fourier Transform of the input data of FIG. 5 after placing two zeroed traces between each recorded trace; note the crossing aliased events.

An example of this is shown in FIG. 5, which is the zero-offset section from a synthetic 2D marine dataset after interleaving two empty traces between each pair of live traces. The slopes vary as a function of both position and time, there are multiple crossing aliased slopes, and the dynamic range varies widely. The f-k transform of these data (after interleaving two empty traces between each pair of live traces) in FIG. 6 shows two replicas originating at the positive and negative Nyquist wavenumbers of the original sampling.

Figure 7:
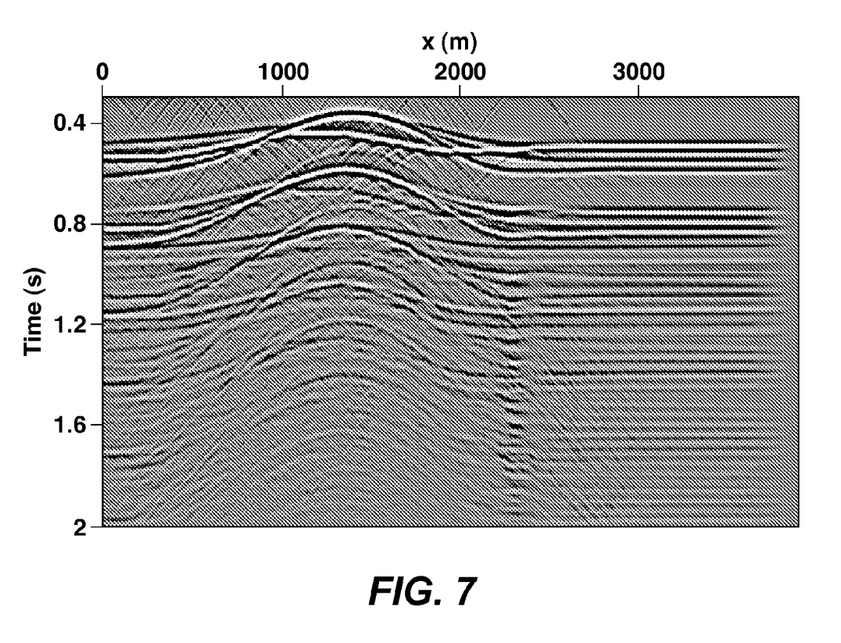
FIG. 7 shows the result of interpolation using GaSPs of the present invention; the curved aliased events of FIG. 5 have been correctly interpolated.
Figure 8:
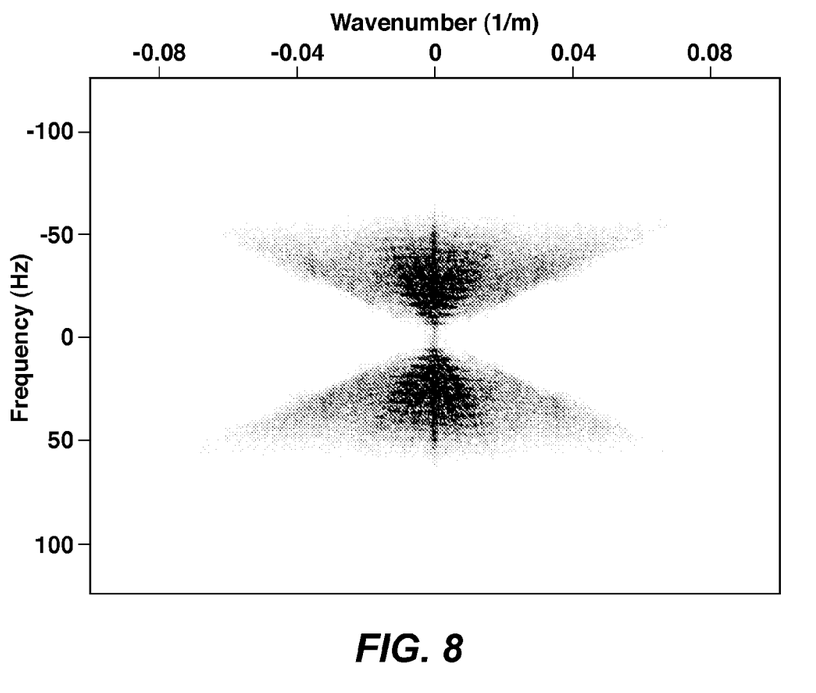
FIG. 8 shows absolute value of 2D Fourier Transform of the interpolated result of FIG. 7; note that the crossing aliased events of FIG. 6 have been recovered.

Applying GaSP-based Gülünary factor-of-three interpolation to the live traces in FIG. 5 produces the output in FIGS. 7 and 8 in time-space and frequency-wavenumber, respectively. The aliasing has been nearly entirely removed and multiple curved crossing events have been successfully interpolated. The algorithm applied used only one-dimensional filtering operations, first to generate the GaSPs from the input data, secondly to create the weighting function by creating a second series of GaSPs generated at frequencies that were ⅓ (the inverse of the interpolation factor) of the GaSPs created earlier, followed by application of the weighting function and the adjoint transformation of each GaSP that is another application of the 1D cascade of filters followed by weighted summation for the final interpolated output.

Match Filtering of Multiples

Match filtering typically takes place using a filter in time and/or space to match a noise model to a dataset containing the noise as well as desired signal (Verschuur and Berkhout, *Geophysics,* 1992, Vol. 57, Pages 1166-1177). More recently, curvelet-based adaptive subtraction has been used to fit a noise model to data, both using real (Herrmann et al., *Geophysics,* 2008, Vol. 73, Pages A17-A21) and complex-valued curvelets (Neelamani et al., *SEG Expanded Abstracts,* 2008, Vol. 27, Pages 3650-3655). The matching filters can have difficulty discriminating overlapping signal from noise, but deal well with bulk shifts between the modeled and actual noise because of the length of the filter in time, while the curvelet-based approaches decompose across scale and angle, but currently do not deal well with large shifts between the modeled and actual noise. By using matching filters on a GaSP-decomposed noise model and data, both overlapping slopes and frequencies and significant kinematic differences can be addressed.

Figure 9:
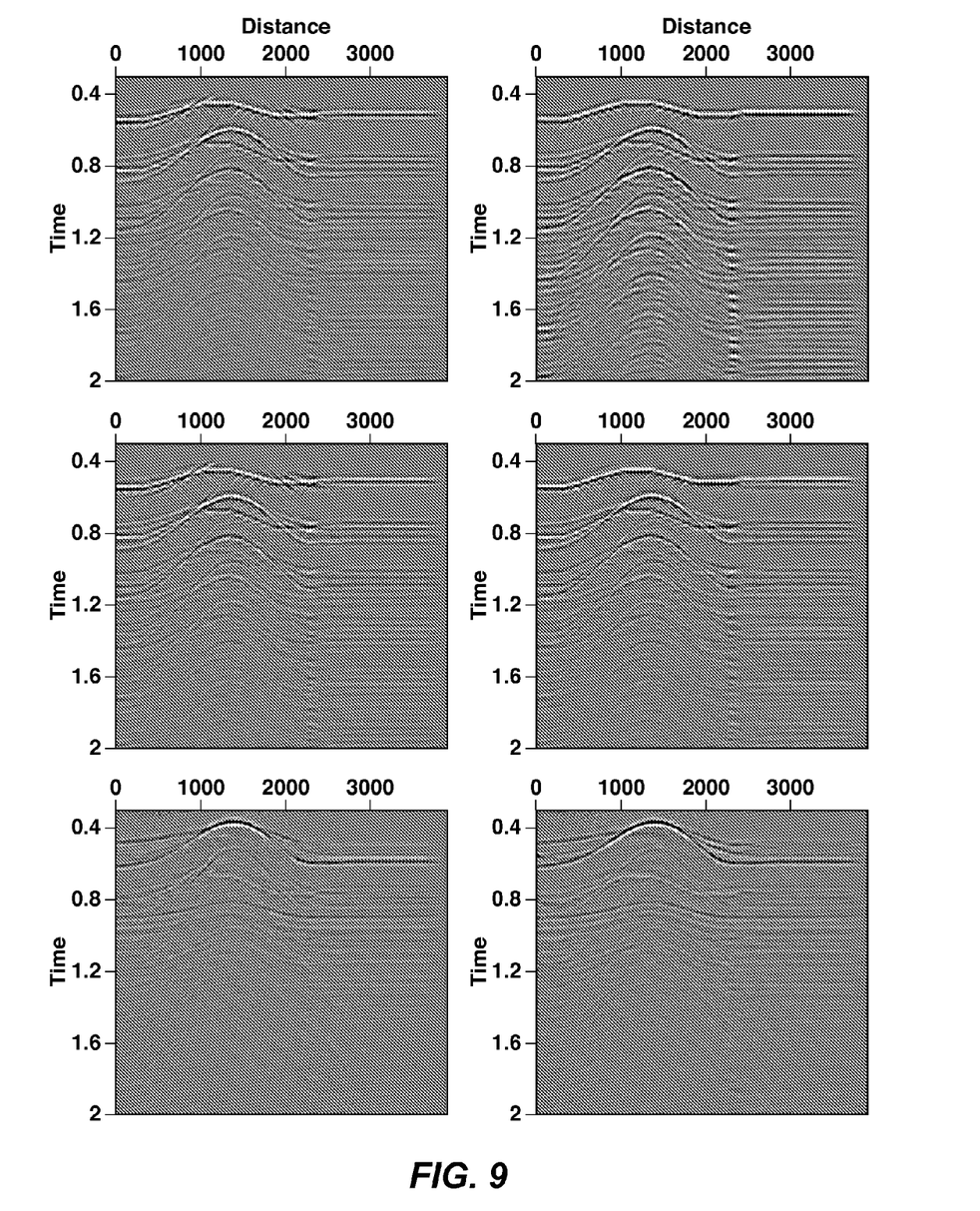
FIG. 9 shows adaptive subtraction results using both GaSP-based adaptive subtraction and standard matching filters; top left: original data; top right: multiple model; middle left multiples after standard matching filters; middle right: multiples after GaSP-based adaptive filtering; bottom-left: standard adaptive subtraction; bottom-right: GaSP-based adaptive subtraction.

The top-left panel of FIG. 9 shows the input dataset containing both primary reflections and multiples, most notably at early arrival times around 0.4-0.5 s in both the input data and the input multiple model in the top-right panel. Using a standard least-squares adaptive subtraction technique on these two panels produces the matched multiple model on the center-left panel. This matched multiple model clearly contains some of the primary information not present in the input multiple model, especially at 0.4-0.5 s at 2000 m. Subtracting these matched multiples from the data produces the undesirable output in the lower left panel of FIG. 9, in which the primaries early in the section are wiped out where the multiples are overlapping with the desired primaries.

Using a GaSP-based adaptive subtraction, where the input data and multiple model are both decomposed into pairs of GaSPs at the same frequencies and slownesses, followed by estimating and applying a set of matching filters with the same parameters as the standard approach for each pair of GaSPs, matching the data and noise independently at each slowness and frequency, followed by the adjoint transformation producing the matched multiples shown in the center-right panel of FIG. 9. These matched multiples do not contain the erroneous dips present in the standard approach. The subtraction of these multiples from the input data produces the result in the lower-right panel, which is a significant improvement upon the standard approach.

Figure 10:
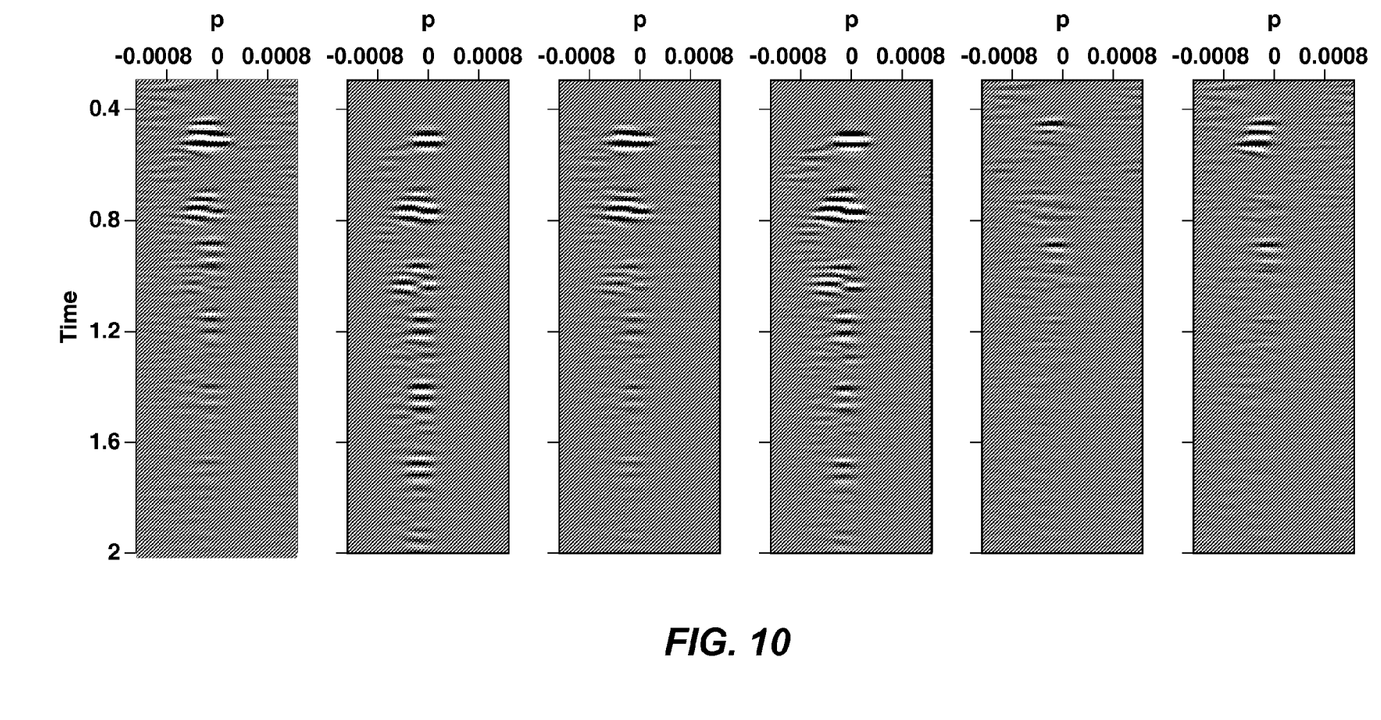
FIG. 10 shows a subset of the GaSP-decomposed results at x=2000 m, f=29 Hz, shown in time (vertically) and slowness (horizontally), from left to right: Original data, multiple model, standard match-filtered multiple model transformed to the GaSP domain, GaSP match-filtered multiple model, standard adaptive subtraction transformed to the GaSP domain, GaSP adaptive subtraction.

These superior results can also be analyzed by viewing the results of both the GaSP-based and standard approaches in the GaSP-decomposed domain. FIG. 10 shows the GaSP decompositions of all of the panels in FIG. 9, showing all generated slownesses at a single spatial position (x=2000 m) and frequency band (centered at 29 Hz). On the far left, it can be seen that the input data contain a broad range of slownesses at 0.5 s, while the adjacent multiple model contains only a flat event (at p=0) at that time. The third panel is the standard adaptive subtraction, which erroneously increases the slowness range of the multiples to match that of the primaries. The GaSP-based matched multiples in the fourth panel do not spread out across slownesses at this time. The standard adaptive subtraction result in the fifth panel removes this desired energy with non-zero slowness, while the GaSP-based adaptive subtraction in the final panel preserves these dipping primary events.

Figure 11:
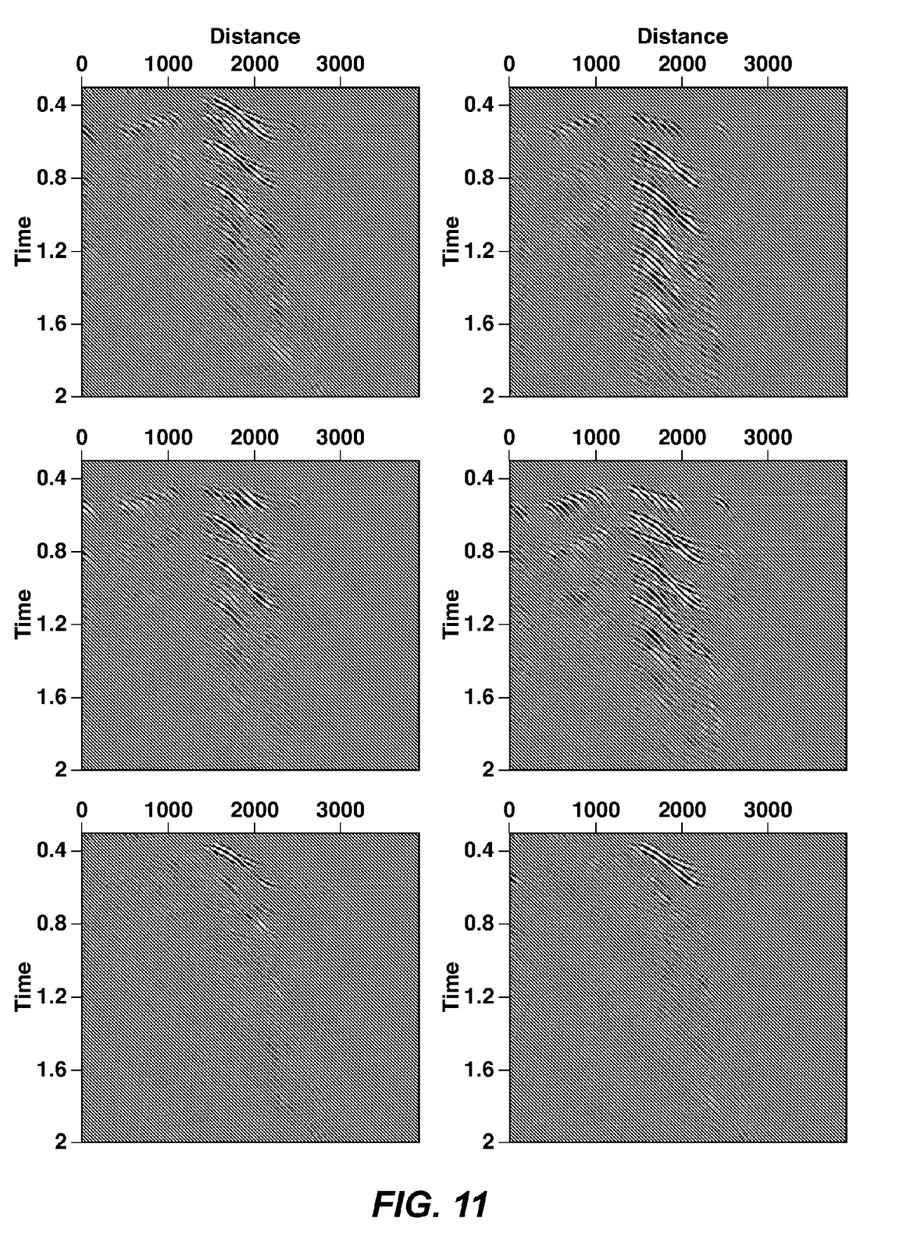
FIG. 11 shows a subset of the GaSP-decomposed results at p=−0.38 ms/m, f=29 Hz, shown in time and space; Top left: original data; top right: multiple model; middle left multiples after standard matching filters; middle right: multiples after GaSP-based adaptive filtering; bottom-left: standard adaptive subtraction; bottom-right: GaSP-based adaptive subtraction.
Figure 12:
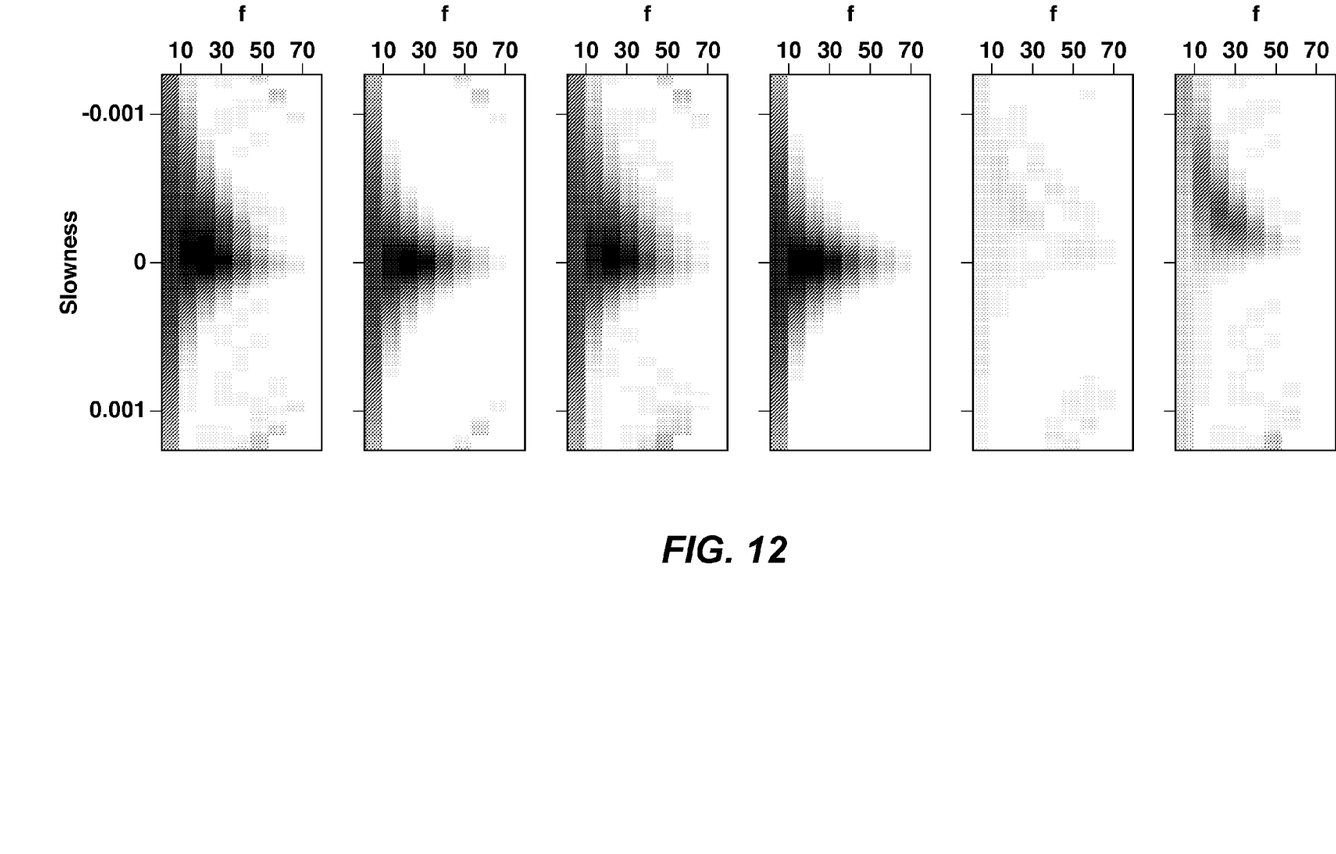
FIG. 12 shows a subset of the envelope of the GaSP-decomposed results at x=2000 m, t=0.05 s, shown in slowness (vertically) and frequency (horizontally), from left to right: original data, multiple model, standard match-filtered multiple model, GaSP match-filtered multiple model, standard adaptive subtraction, and GaSP adaptive subtraction.

These results can also be examined at a single slowness and frequency at all spatial locations and times as in FIG. 11, or across all frequencies and slownesses at a single location and time as in FIG. 12, where the over-aggressiveness of the traditional adaptive subtraction is very apparent. The standard match filtering destroys all desired signal, while separating the data into slowness and frequency preserves the signal at non-zero slowness, as seen on the rightmost panel.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A computer-implemented geophysical prospecting method for producing a representation of a subsurface region from multi-dimensional seismic data, comprising:
    (a) using a cascade of filtering operations to decompose the seismic data into components in a frequency-wavenumber domain wherein the data are represented in terms of tiled windows;
    (b) applying one or more processing operations to the decomposed data, said processing operations being designed to enhance a representation of the subsurface region from the seismic data;
    (c) applying the filtering operations' adjoint operations to the decomposed data after the processing operations, then summing data components weighted by normalization factors computed to produce a flat impulse response; and
    (d) using the weighted and summed data from (c) to generate a representation of the subsurface region, and using the representation for geophysical prospecting.

2. The method of claim 1, wherein the one or more processing operations each require an assumption of stationarity, that is that events in the seismic data are planar in nature and that their spectra, either dip or frequency, do not change with position.

3. The method of claim 1, wherein the cascade of filtering operations is a series of 1D Gaussian filters modulated by complex exponentials, creating a series of Gaussian windows in the frequency-wavenumber domain.

4. The method of claim 3, wherein the series of modulated 1D Gaussian filters are designed to create a series of Fourier-domain windows that when combined captures a selected frequency range and slowness range of frequency and wavenumber space.

5. The method of claim 4, wherein the windows are spaced equally in frequency and slowness within said selected frequency range and slowness range.

6. The method of claim 2, wherein the one or more processing operations include one or both of noise removal and data interpolation.

7. The method of claim 3, wherein the tiled windows are Gaussian slowness-period packets g that may be expressed mathematically as $$g_{f_0 k_0}(t, x) = \frac{2\pi h_f h_k}{\ln 2} \operatorname{Re}\left( \left( e^{i 2\pi f_0 t} e^{-\frac{\pi^2 t^2 h_f^2}{\ln 2}} \right) * \left( e^{i 2\pi k_0 x} e^{-\frac{\pi^2 x^2 h_k^2}{\ln 2}} \right) \right)$$

where $h_k$ and $h_f$ are the Gaussian's half width at half maximum along wavenumber k and frequency f, respectively, and $f_0$ and $k_0$ are central frequencies and wavenumbers of the packets distributed evenly in central slowness $p_0 = k_0/f_0$ and central frequency.

8. The method of claim 7, wherein said normalization factors computed to produce a flat impulse response may be expressed mathematically as $$W_f = \sum_{m=-(n_f-1)/2}^{(n_f-1)/2} 2 e^{-\frac{\pi^2 h_f^2}{\ln 2} \left( \frac{f_{max} - f_{min}}{2} - m \frac{\sqrt{2} \ln 2}{\pi h_f} \right)^2}$$

and $$W_p(f) = \sum_{l=-(n_p-1)/2}^{(n_p-1)/2} 2e^{-2\frac{(2\pi h_x l \Delta p f)^2}{\ln 2}}$$

where $n_t$ Gaussian windows are applied across the time axis in time-space domain with a half-width in time of $h_t$, and $n_p$ Gaussian windows are applied across the spatial axis with a half-width of $h_x$ and slowness interval of $\Delta p$.

9. The method of claim 3, wherein the seismic data are expressed in terms of depth rather than time, and the using of a cascade of 1D modulated Gaussian filters creates a decomposition that when combined captures a selected wavenumber range of $k_x$-$k_y$-$k_z$ space.

10. The method of claim 1, wherein the method is performed using a computer.

11. The method of claim 1, wherein the seismic data consist of two or more different sets of seismic data, each acquired from said subsurface region, wherein said one or more processing operations include combinations of the components of the two or more different sets of seismic data.

12. The method of claim 1, further comprising repeating steps (a)-(c) for at least one more iteration to further enhance the representation of the subsurface region generated in (d), wherein the weighted and summed data from (c) become the seismic data that are decomposed in (a) in a next iteration.

13. The method of claim 1, wherein the seismic data are pre-stack, and a plurality of central frequencies and slownesses are selected within a selected frequency and slowness range so as to produce the flat impulse response, and the cascade of filtering operations comprises a 1D filter for each central frequency and a 1D filter for each central slowness, each 1D filter being applied sequentially to the seismic data.

* * * * *